United States Patent Office__

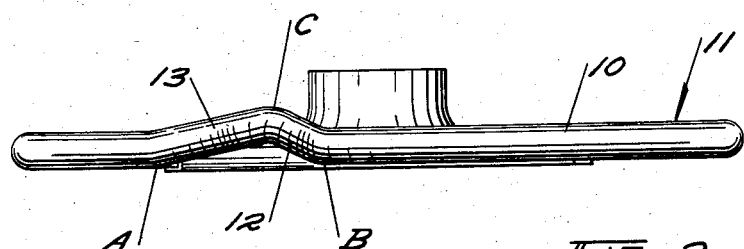
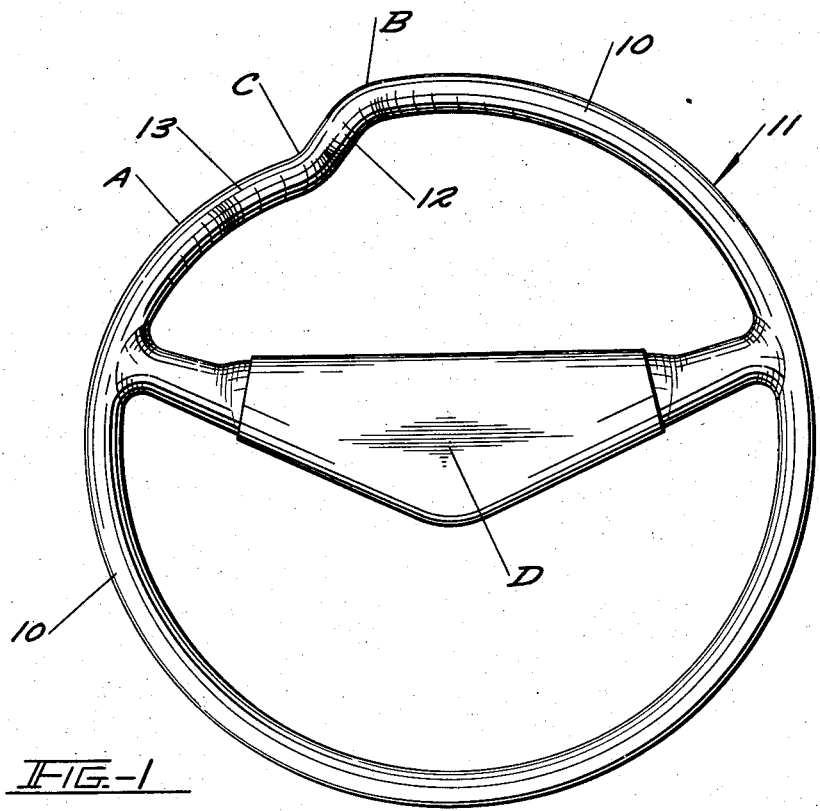

2,881,638
Patented Apr. 14, 1959

2,881,638

HAND GRIP STEERING WHEEL

Frederic W. Taylor, Indianapolis, Ind.

Application July 24, 1957, Serial No. 673,817

1 Claim. (Cl. 74—552)

This invention relates to a steering wheel for the present day automobile and the like, and has for a primary purpose the provision of a rim of the wheel offset in two directions from the true circular shape and plane of the wheel to receive the hand of the driver in that offset portion for not only a firm and positive gripping of the rim of the wheel, but also to relieve the usual fatigue resulting from tense contraction of the muscles of the hand and fingers in holding onto the wheel rim. The structure entering into the invention provides a positive abutment for one hand of the operator to prevent that hand from slipping around the rim of the wheel, and permitting the driver to give quick and easy turns of the wheel.

These and other advantages of the invention will become apparent in the following description of a structure embodying the invention as illustrated in the accompanying drawing, in which Fig. 1 is a view in top plan of a wheel embodying my invention; and Fig. 2 is a view in side elevation.

In the modern automobile, the rim 10 of the wheel 11 has been reduced to an exceedingly small diameter and is also quite smooth in finish, both of which factors require a very tight closing of one's hand on the rim in order to turn the wheel 11 as is required in steering.

The rim 10 is made, in accordance with my invention, to have a full circular shape with the exception of a variance therefrom in from thirty to sixty degrees of the rim of the wheel, this variation being between the zones A and B. In that zone between A and B, the rim 10 is brought inwardly through an arc of reduced radius as compared to the arc of radius of the major length of the rim 10, and thence is abruptly brought outwardly through a short length 12 to come back at B into the arc of the major length of the rim 10. That is, there is provided a hand rest portion 13 between the zone A and the zone C, from which zone C the rim extends through the portion 12 back to the zone B. That inward curving on a reduced radius of the portion 13 is also carried out of the plane of the rim 10 between the zones A and B in a clockwise direction, to have the length 13 drop angularly downwardly from the plane of the topside of the rim 10 as indicated in Fig. 2, and thence the portion 12 is brought upwardly from the zone C back to the zone B into that plane.

Thus there are two variations from the standard circular wheel rim, namely the arcuate inward curving of the length 13 toward the center D of the wheel 11, and simultaneously a downwardly extending direction of this portion 13 to the continuing portion 12 which comes back into the zone B.

The driver's hand will normally rest on the portion 13 to have the side of the hand in abutment with the rim length 12. By dropping the length 13 inwardly and downwardly, this gives a very positive abutment of the hand against the portion 12 in combination with the upwardly and outwardly extending direction thereof. By reason of this particular formation, the hand does not have to grasp the rim 10 so tightly as it would otherwise do in the absence of the downward swing of the member 13 since the hand will abut the length 12 in any event. In the absence of that downwardly directed portion 13, the fingers of the driver's hand would have to come around and grip the rim 10 very tightly when turning the wheel. That is to say, the very fact that the hand extends across the portion 13 means that the edge of it will be in abutment with the length 12 regardless of whether or not the fingers are curved around under the rim 10 or extend straight from the driver's hand. Therefore, the driver may drive with his hand on the wheel 11 in a more relaxed manner without the fatiguing effect of having to hold the wheel tightly otherwise.

Therefore while I have shown my invention in the one best form as now known to me, it is obvious that structural changes may be employed without departing from the spirit of the invention, and I therefore do not desire to be limited to that precise form beyond the limitations which may be imposed by the following claim.

I claim:

A steering wheel having a rim section offset in two directions from the true circular shape and plane of the wheel comprising a rim of a fixed radius throughout its major circumferential length and lying in a common plane; said rim by a portion at an upper, remote zone from a driver extending inwardly and downwardly from said fixed radius length and plane respectively and thence through a second portion extending outwardly and upwardly back into said length and plane; said portion receiving a hand thereacross with the edge of the hand in abutment with said second portion.

References Cited in the file of this patent

UNITED STATES PATENTS

| | | |
|---|---|---|
| D. 147,608 | Benzel | Oct. 7, 1947 |
| D. 147,702 | Vevirit | Oct. 14, 1947 |
| 1,984,293 | Webb | Dec. 11, 1934 |